US012057613B2

(12) United States Patent
Krueger

(10) Patent No.: US 12,057,613 B2
(45) **Date of Patent: *Aug. 6, 2024**

(54) WAVEGUIDE INCLUDING A CONDUCTIVE CHANNEL EMBEDDED IN A SUBSTRATE AND WITH VIAS CONNECTED TO AN ANTENNA AND A CIRCUIT COMPONENT

(71) Applicant: Honeywell Federal Manufacturing & Technologies, LLC, Kansas City, MO (US)

(72) Inventor: Daniel Scott Krueger, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,737

(22) Filed: Jun. 8, 2023

(65) Prior Publication Data

US 2023/0335877 A1 Oct. 19, 2023

Related U.S. Application Data

(63) Continuation of application No. 17/863,574, filed on Jul. 13, 2022, now Pat. No. 11,710,884, which is a continuation of application No. 16/851,486, filed on Apr. 17, 2020, now Pat. No. 11,482,767.

(51) Int. Cl.

| | |
|---|---|
| ***H01P 3/12*** | (2006.01) |
| ***H01P 11/00*** | (2006.01) |
| *H01P 3/16* | (2006.01) |

(52) U.S. Cl.

CPC ............ *H01P 3/121* (2013.01); *H01P 11/002* (2013.01); *H01P 3/16* (2013.01); *H01P 11/006* (2013.01)

(58) Field of Classification Search

CPC .. H01P 3/12; H01P 3/121; H01P 3/122; H01P 11/002

USPC .......................................................... 333/239

See application file for complete search history.

(56) References Cited

U.S. PATENT DOCUMENTS

| | | | | |
|---|---|---|---|---|
| 11,482,767 | B2 * | 10/2022 | Krueger | H01P 3/122 |
| 11,710,884 | B2 * | 7/2023 | Krueger | H01P 3/121 333/239 |
| 2015/0359087 | A1 * | 12/2015 | Lee | H05K 3/4614 174/255 |
| 2018/0183127 | A1 * | 6/2018 | Huang et al. | H01P 3/121 |
| 2018/0191047 | A1 * | 7/2018 | Huang et al. | H01P 11/006 |

* cited by examiner

*Primary Examiner* — Benny T Lee

(74) *Attorney, Agent, or Firm* — Hovey Williams LLP

(57) ABSTRACT

Waveguides and methods for manufacturing a waveguide that include forming a first channel in a first layer of dielectric material, the first channel comprising one or more walls; forming a second channel in a second layer of dielectric material, the second channel comprising one or more walls; depositing electrically conductive material on the one or more walls of the first channel; depositing electrically conductive material on the one or more walls of the second channel; arranging the first layer adjacent to the second layer to form a stack with the first channel axially aligned with and facing the second channel; and heating the stack so that the conductive material on the one or more walls of the first channel and the conductive material on the one or more walls of the second channel connect to form the waveguide.

17 Claims, 9 Drawing Sheets

WAVEGUIDE INCLUDING A CONDUCTIVE CHANNEL EMBEDDED IN A SUBSTRATE AND WITH VIAS CONNECTED TO AN ANTENNA AND A CIRCUIT COMPONENT

RELATED APPLICATIONS

The present application is a continuation application and claims priority of co-pending application entitled "BLIND, BURIED, MULTI-LAYER SUBSTRATE-EMBEDDED WAVEGUIDE", Ser. No. 17/863,574, filed on Jul. 13, 2022, which issued as U.S. Pat. No. 11,710,884 on Jul. 25, 2023, and which claims priority of previously co-pending application entitled "A METHOD OF MANUFACTURING A WAVEGUIDE COMPRISING STACKING DIELECTRIC LAYERS HAVING ALIGNED METALLIZED CHANNELS FORMED THEREIN TO FORM THE WAVEGUIDE", Ser. No. 16/851,486, filed on Apr. 17, 2020, which issued as U.S. Pat. No. 11,482,767 on Oct. 25, 2022, the contents of these are hereby incorporated in their entireties by reference herein.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Waveguides are used to transport electromagnetic energy between electronic components, such as circuit components, and antennas and often physically connect circuit boards to antennas. The module, waveguide, and antenna are often discrete components attached together via soldering or welding. However, waveguides are often bulky and occupy a lot of valuable space in an electronic device. Additionally, waveguides are often made out of metals and therefore have different coefficients of thermal expansion than the circuit boards to which they are attached. Over time this causes stress at the connection points between the waveguides and the circuit board, which reduces the performance of the waveguides and the circuit boards.

The background discussion is intended to provide information related to the present invention which is not necessarily prior art.

SUMMARY OF THE INVENTION

The present invention solves the above-described problems and other problems by providing a distinct advance in the art of waveguides. More particularly, embodiments of the present invention provide waveguides and methods of forming waveguides that are more space efficient and robust.

A waveguide according to an embodiment of the present invention broadly includes a substrate and a plurality of conductive walls. The substrate comprises a first outer surface, a second outer surface opposing the first outer surface, and a channel disposed between the first outer surface and the second outer surface and comprising one or more inner surfaces defining an inner chamber.

The plurality of conductive walls are positioned on the one or more inner surfaces of the channel to form the waveguide. By having the waveguide inside the substrate, a circuit component may be placed on the substrate for efficient use of space. Additionally, the substrate may comprise cofired ceramic, so expansion due to varying coefficients of thermal expansion will not be as pronounced. This will improve the longevity of the connection between the circuit component and the waveguide.

Another embodiment of the invention is a method of manufacturing a waveguide. The method comprises forming a first channel in a first layer of dielectric material, the first channel comprising one or more walls; forming a second channel in a second layer of dielectric material, the second channel comprising one or more walls; depositing electrically conductive material on the one or more walls of the first channel; depositing electrically conductive material on the one or more walls of the second channel; arranging the first layer adjacent to the second layer to form a stack with the first channel axially aligned with and facing the second channel; and heating the stack so that the conductive material on the one or more walls of the first channel and the conductive material on the one or more walls of the second channel connect to form the waveguide.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
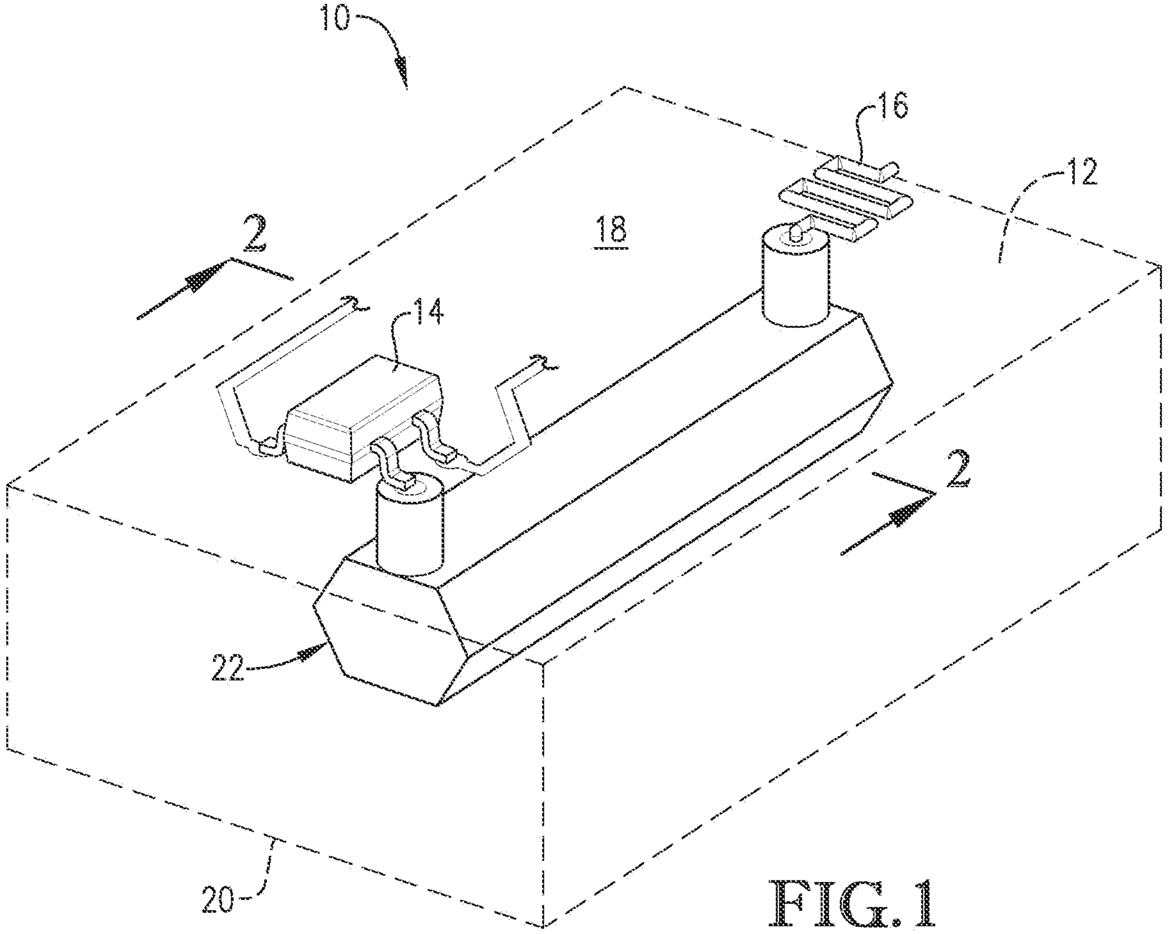
FIG. 1 is a partial view of a circuit board implementing a waveguide constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
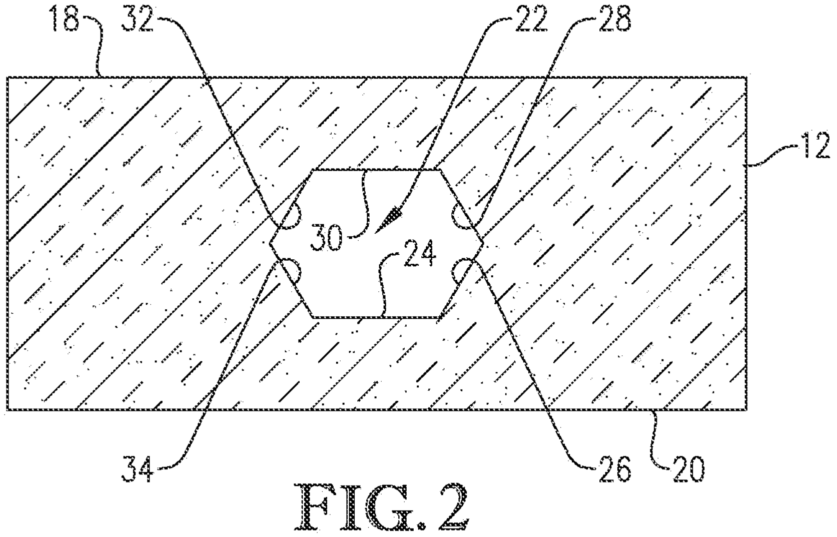
FIG. 2 is a cross-sectional view of the circuit board of FIG. 1 without the waveguide.

Turning to FIG. 1, an embedded waveguide 10 constructed in accordance with an embodiment of the present invention is illustrated. The waveguide 10 may be implemented in a circuit board 12 having a circuit component 14, an antenna 16, a first outer surface 18, a second outer surface 20, and a channel 22 disposed between the first outer surface 18 and the second outer surface 20. Turning to FIG. 2, the channel 22 may comprise one or more inner surfaces 24, 26, 28, 30, 32, 34. For example, the channel 22 may comprise a bottom inner surface 24 parallel with the first outer surface 18, a top inner surface 30 parallel with the second outer surface 20, a pair of first inner side surfaces 26, 28, and a pair of second inner side surfaces 32, 34. The circuit board 12 may comprise low temperature cofired ceramic, high temperature cofired ceramic, ultra-low temperature cofired ceramic, laminate printed circuit board material, or other multilayer or additively manufactured microelectronic packaging substrate material. The channel 22 may have any cross-sectional shape without departing from the scope of the present invention including but not limited to a square cross-sectional shape, a rectangular cross-sectional shape, a rounded cross-section shape, or the like. For example, as shown in FIG. 1, the channel 22 may have a hexagonal cross-sectional shape.

Figure 3A:
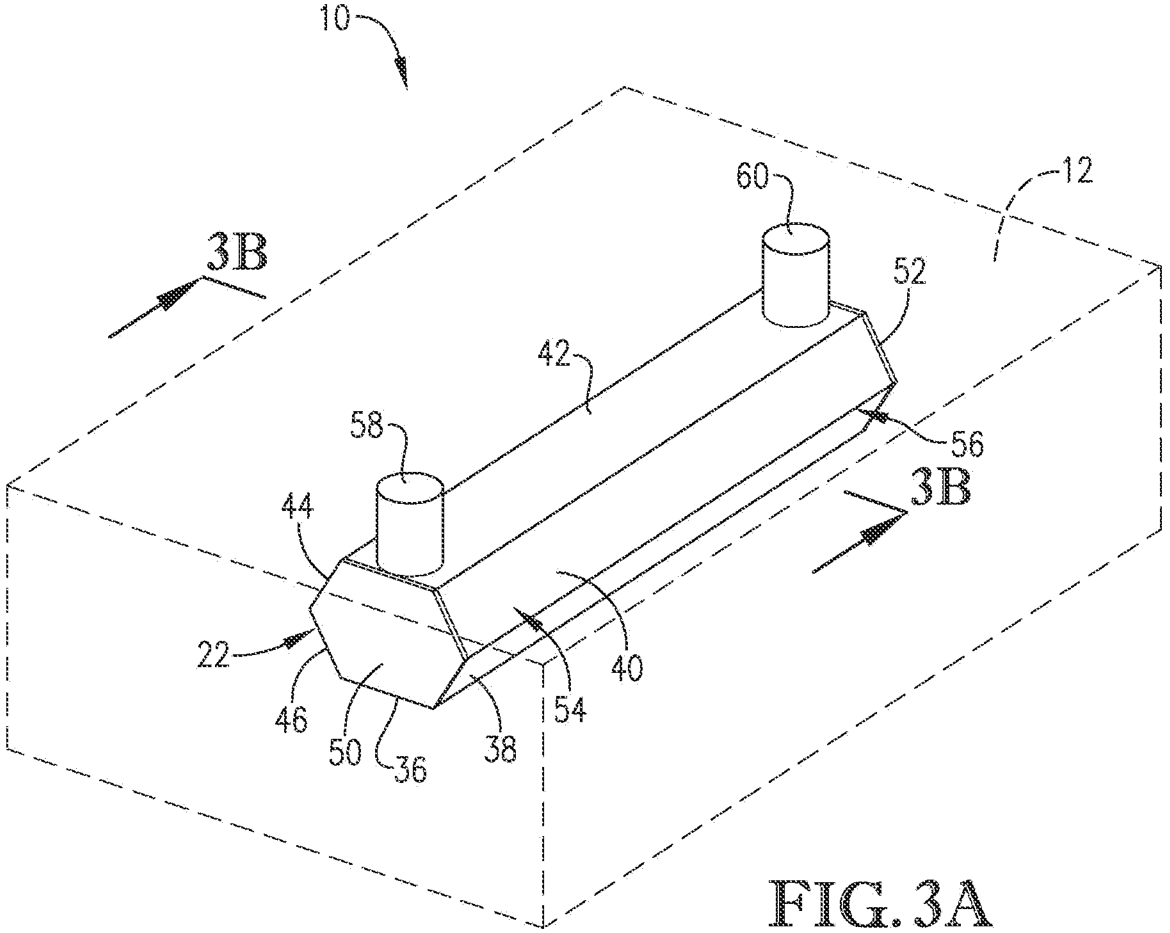
FIG. 3A is a perspective view of the waveguide of FIG. 1.
Figure 3B:
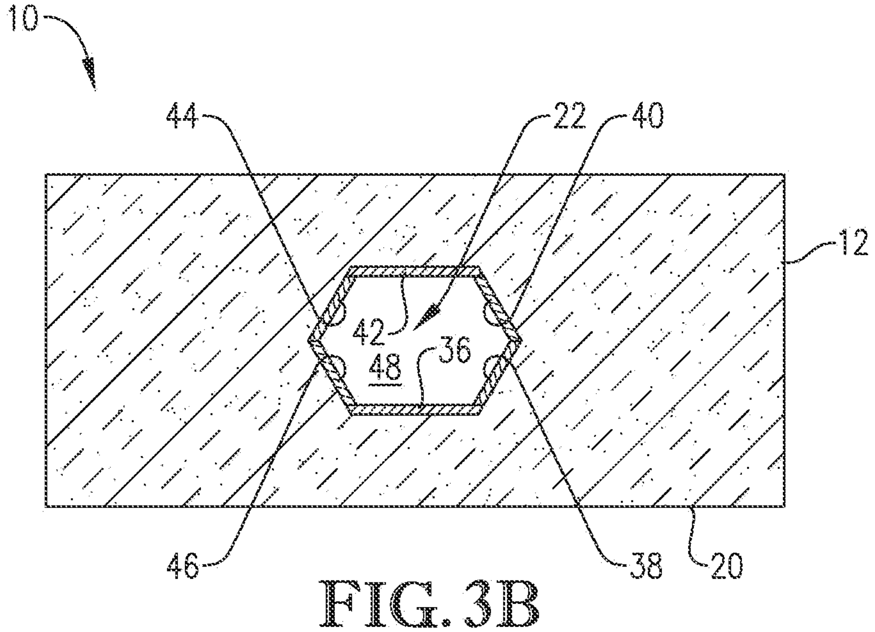
FIG. 3B is a cross-sectional view of the circuit board with the waveguide of FIG. 3A.
Figure 3C:
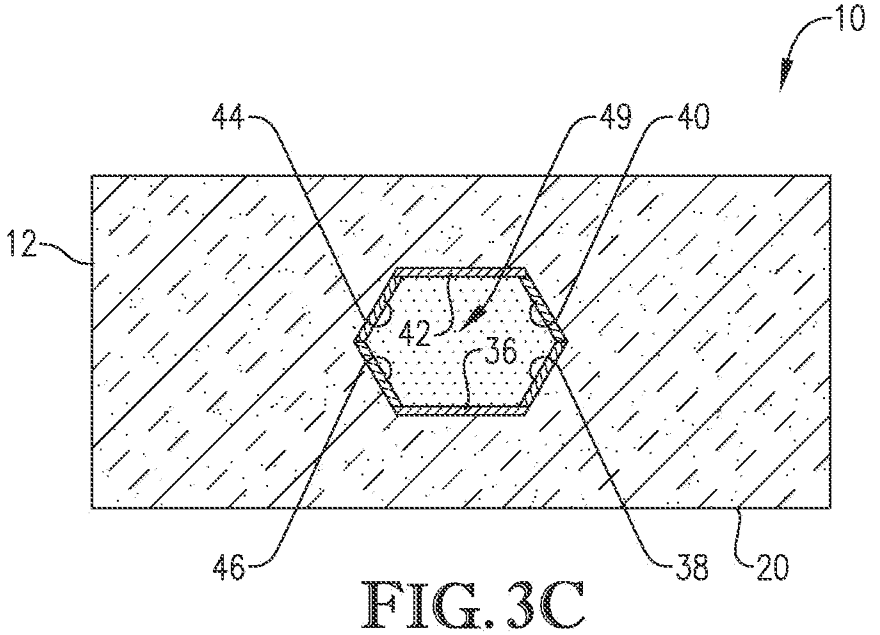
FIG. 3C is a cross-sectional view of the circuit board along lines 3B with the waveguide of FIG. 3A having secondary material.

Turning to FIG. 3A, the waveguide 10 (implemented in circuit board 12) directs signals from the circuit component 14 (depicted in FIG. 1) to the antenna 16 (depicted in FIG. 1) through the channel 22 and broadly comprises a plurality of conductive walls 36, 38, 40, 42, 44, 46. Two or more of the conductive walls may be parallel to one another. The conductive walls 36, 38, 40, 42, 44, 46 may be made of conductive material, such as metal. Turning to FIG. 3B, the conductive walls 36, 38, 40, 42, 44, 46 of the waveguide 10 are positioned on the one or more inner surfaces 24, 26, 28, 30, 32, 34 (depicted in FIG. 2) of the channel 22 to define a cavity 48 in the circuit board 12. For example, one of the conductive walls 36, 38, 40, 42, 44, 46 may be a bottom wall 36 positioned on the bottom inner surface 24 (depicted in FIG. 2), one conductive wall may be a top wall 42 positioned on the top inner surface 30 (depicted in FIG. 2), some conductive walls may be first side walls 38, 40 positioned on the first pair of inner side surfaces 26, 28 (depicted in FIG. 2), and the remaining may be second side walls 44, 46 positioned on the second pair of inner side surfaces 32, 34 (depicted in FIG. 2). The cavity 48 may be empty, i.e., filled with air or gas of some sort. Turning to FIG. 3C, in some embodiments, the cavity 48 (FIG. 3B) defined by conductive walls 36, 38, 40, 42, 44, 46 in the circuit board 12 (having outer surface 20 as depicted in FIGS. 3B and 3C) of the waveguide 10 is filled with a dielectric material 49. The type of dielectric material 49 may be selected for optimal tuning with the antenna 16 (depicted in FIG. 1). The cavity 48 may have any cross-sectional shape without departing from the scope of the present invention. For example, the cavity 48 may have a hexagonal cross- sectional shape.

As shown in FIG. 3A, the waveguide 10 may further comprise end walls 50, 52 connected to the conductive walls 36, 38, 40, 42, 44, 46 in the circuit board 12. The end walls 50, 52 may terminate each end 54, 56 of the cavity 48 so that the waveguide 10 is enclosed. This allows the circuit component 14 (depicted in FIG. 1) and the antenna 16 (depicted in FIG. 1) to be connected to the waveguide 10 through one or more vias 58, 60. The vias 58, 60 may be solid filled or sidewall-coated vias.

Figure 4:
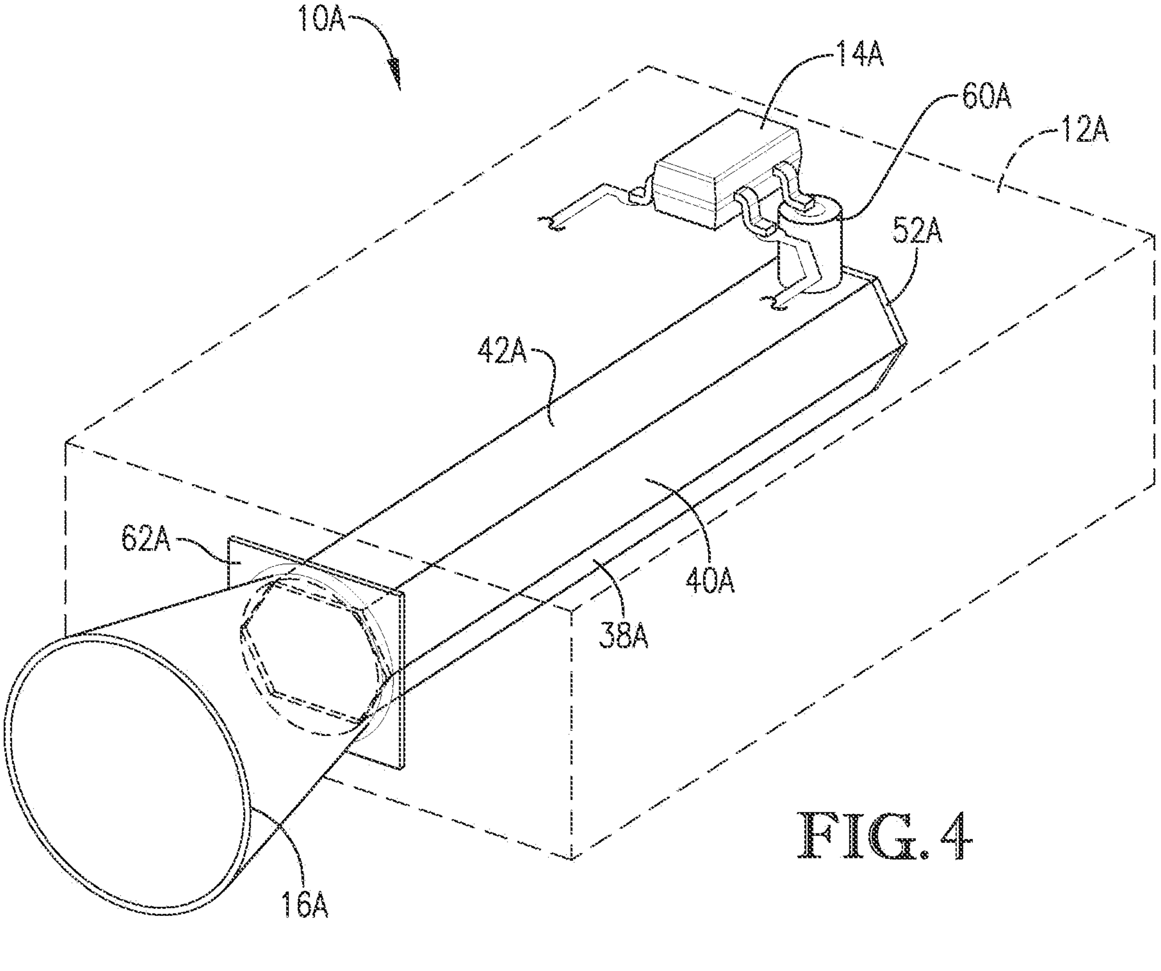
FIG. 4 is a partial view of a circuit board implementing a waveguide constructed in accordance with another embodiment of the present invention.
Figure 5:
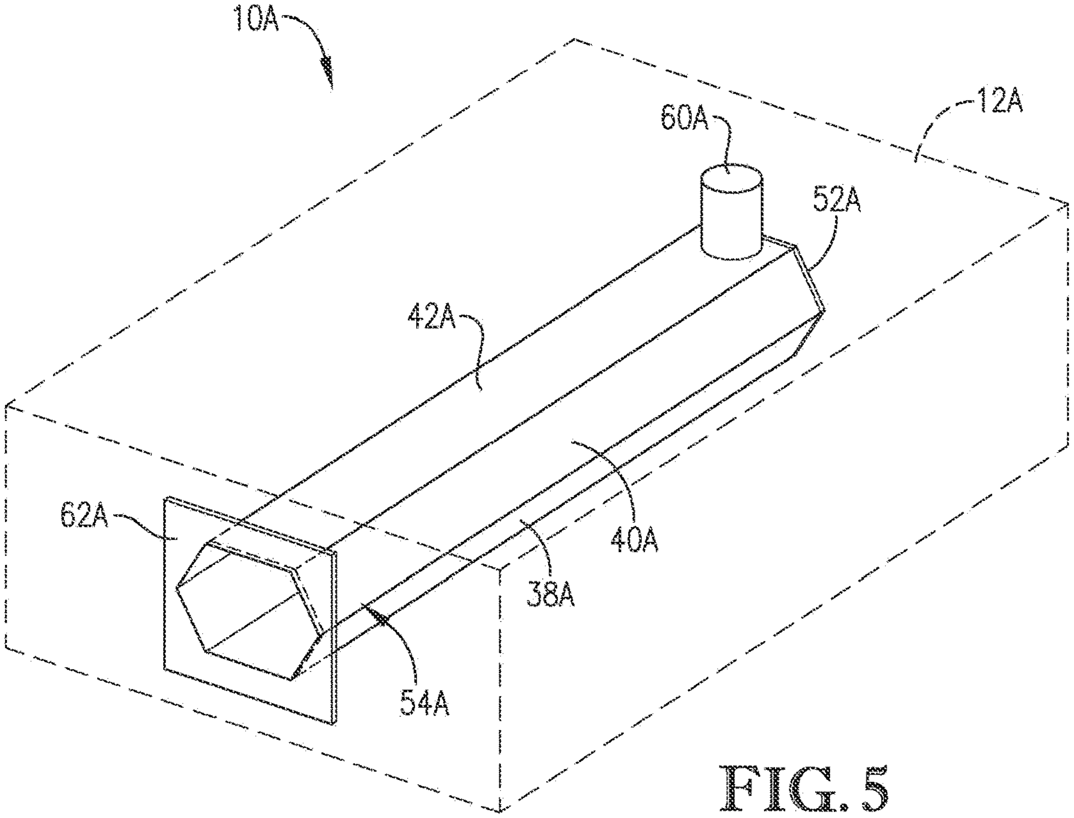
FIG. 5 is a perspective view of the waveguide of FIG. 4.

An embedded waveguide 10A constructed in accordance with another embodiment of the invention is shown in FIGS. 4 and 5 and is attached to a discrete antenna 16A (as depicted in FIG. 4). The waveguide 10A may comprise substantially similar components as waveguide 10; thus, the components of waveguide 10A as depicted in FIGS. 4 and 5 that correspond to similar components in waveguide 10 have an ‘A’ appended to their corresponding reference numerals and description of these similar components may be omitted.

Figure 6:
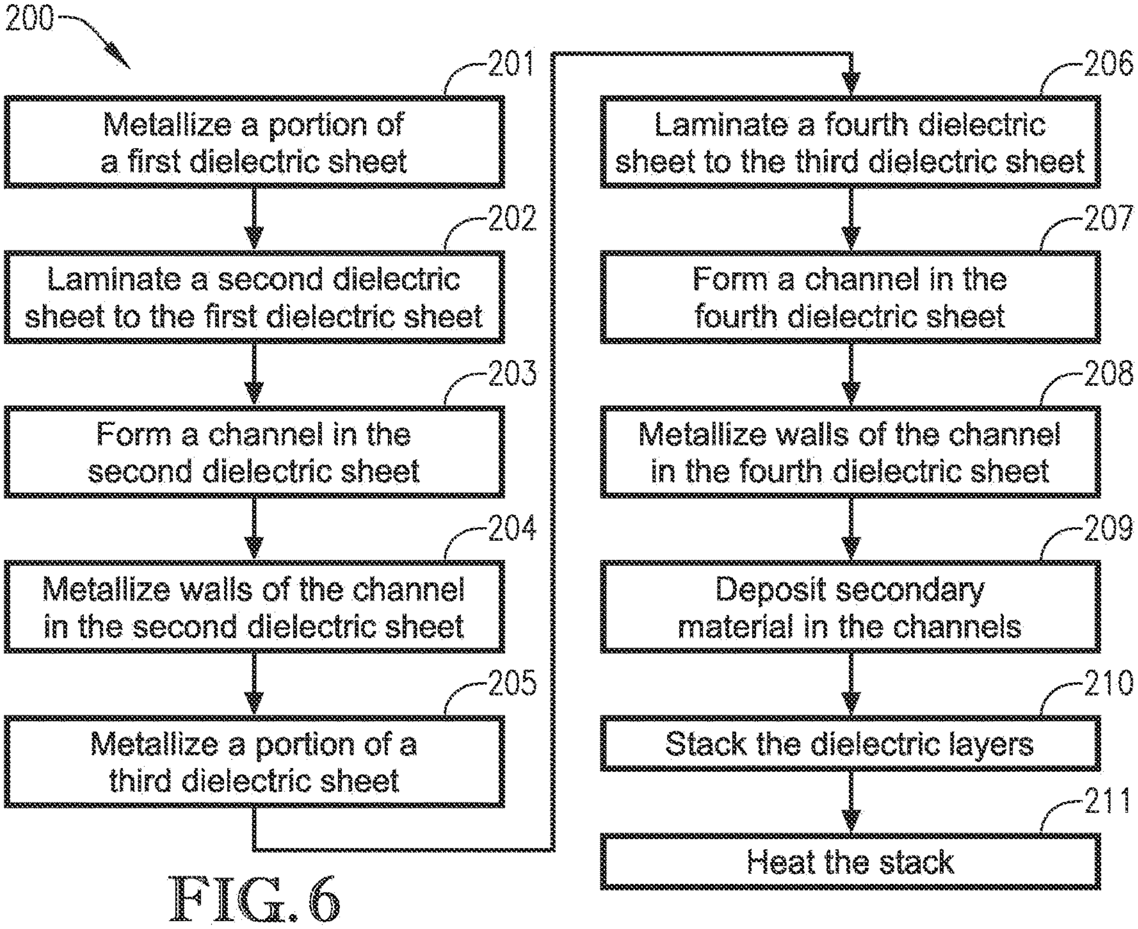
FIG. 6 is a flowchart illustrating steps for manufacturing a waveguide according to an embodiment of the present invention.

The flow chart of FIG. 6 depicts the steps of an exemplary method 200 of manufacturing a waveguide. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved. In addition, some steps may be optional.

Figure 7:
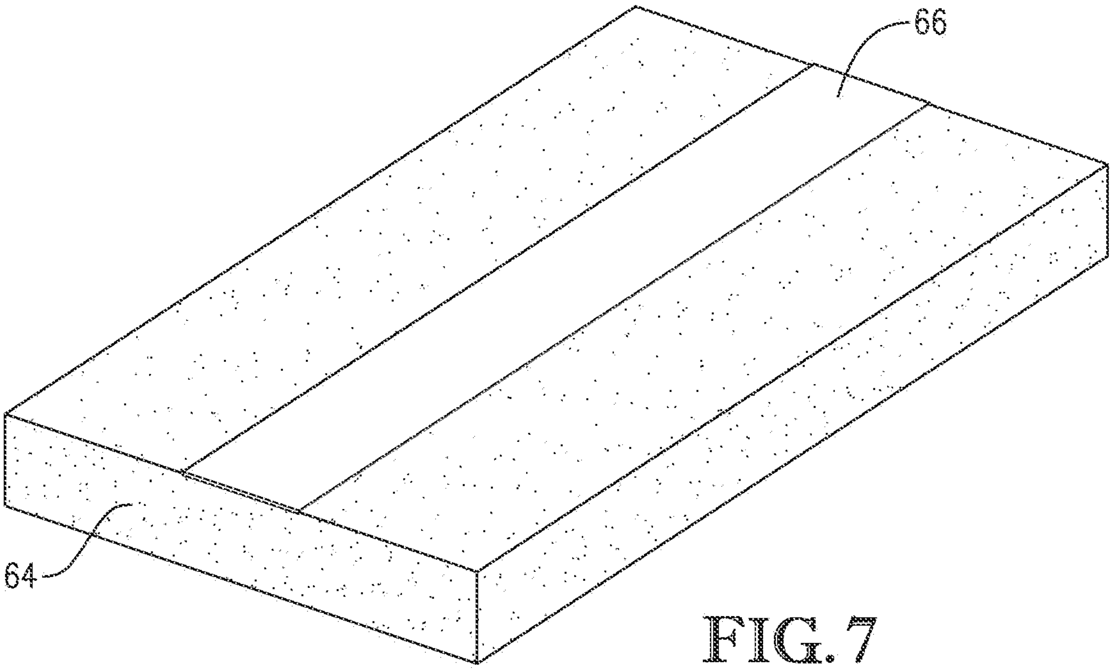
FIG. 7 is a perspective view of a first sheet of a waveguide constructed according to an embodiment of the present invention.

Referring to step 201, a portion of a first sheet 64 of dielectric material is metallized to form a metallized strip 66, as depicted in FIG. 7. The first sheet 64 of dielectric material may comprise low temperature cofired ceramic, high temperature cofired ceramic, ultra-low temperature cofired ceramic, laminate printed circuit board material, or other multilayer or additively manufactured microelectronic packaging substrate material. The portion of the first sheet 64 may be metallized using paste comprising conductive materials (such as copper, gold, silver, other metals, etc.), deposition of conductive materials onto the first sheet 64, or the like.

Figure 8:
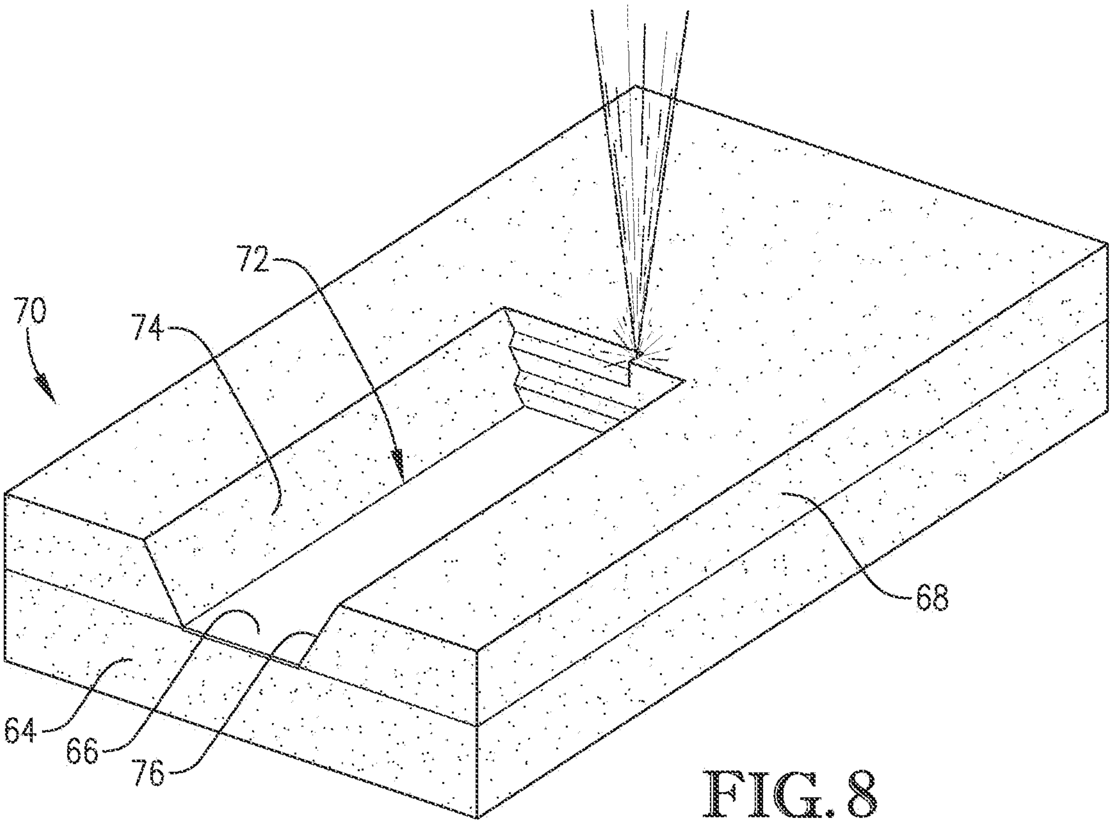
FIG. 8 is a perspective view of a second sheet of the waveguide of FIG. 7.

Referring to step 202, a second sheet 68 of dielectric material is laminated on the first sheet 64. The second sheet 68 may be laminated on the first sheet 64 so that the metal strip 66 is between the first sheet 64 and the second sheet 68 to form a first dielectric layer 70, as depicted in FIG. 8. The second sheet 68 may also comprise low temperature cofired ceramic, high temperature cofired ceramic, ultra-low temperature cofired ceramic, laminate printed circuit board material, or other multilayer or additively manufactured microelectronic packaging substrate material.

Referring to step 203, a portion of the second sheet 68 may be removed to expose at least a portion of the metallized strip 66. The portion of the second sheet 68 may be removed along a first axis to form a first channel 72, as depicted in FIG. 8. The channel 72 may comprise one or more side walls 74, 76 extending from the metallized strip 66. The portion of the second sheet 68 may be removed using machining, a laser, or the like.

Figure 9:
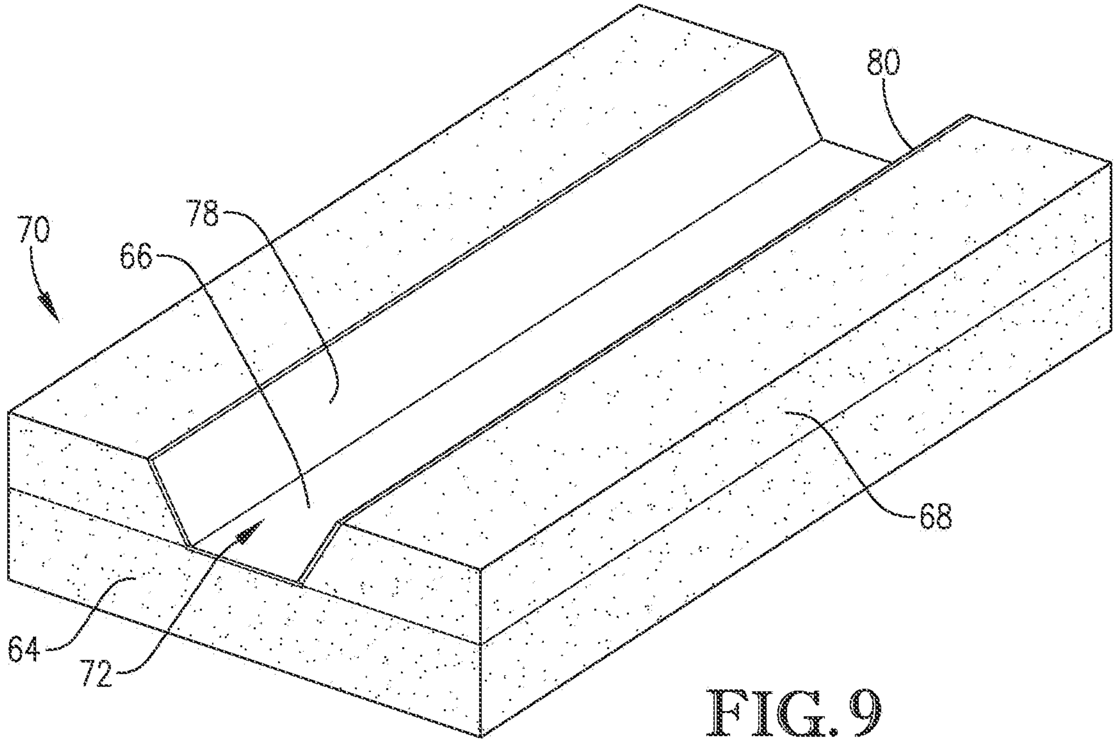
FIG. 9 is a perspective view of a first dielectric layer of the waveguide of FIG. 7.

Referring to step 204, the one or more walls 74, 76 of the first channel 72 (as depicted in FIG. 8) are metallized to form one or more metallized walls 78, 80 (as depicted in FIG. 9). The metallized walls 78, 80 may lie flatly on, or conform to the surfaces of, the walls 74, 76 of the first channel 72, as depicted in FIG. 9. The walls 74, 76 of the first channel 72 may be metallized using paste comprising conductive materials, deposition of conductive materials onto the walls 74, 76, or the like.

Figure 10:
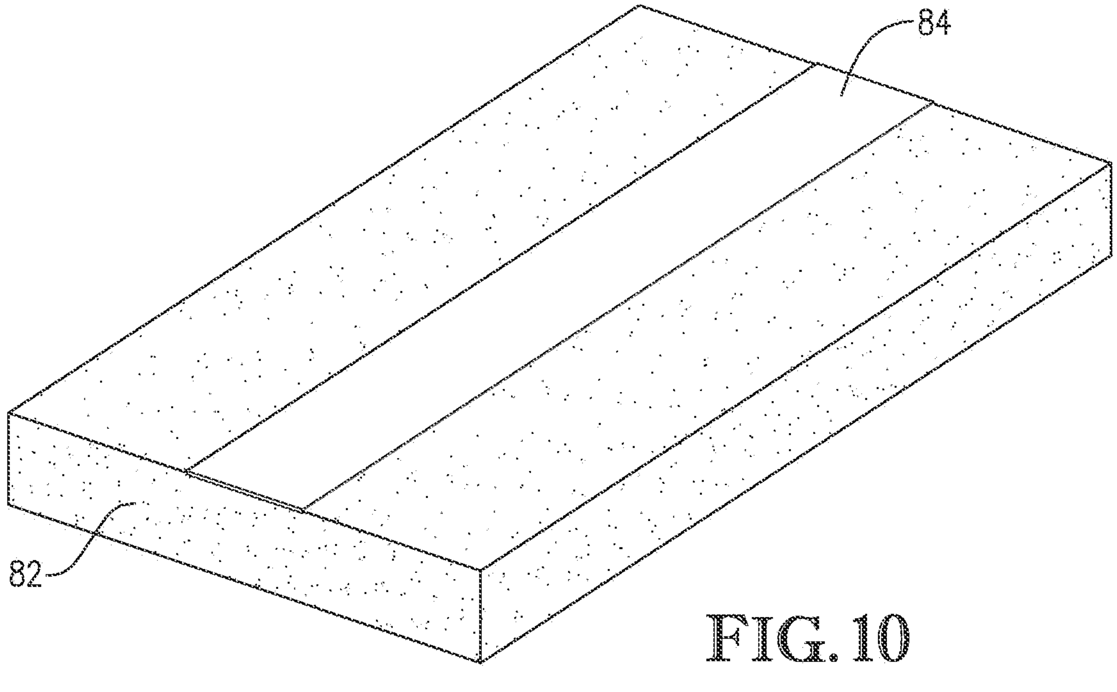
FIG. 10 is a perspective view of a third sheet of the waveguide of FIG. 7.

Referring to step 205, a portion of a third sheet 82 of dielectric material is metallized to form a metallized strip 84, as depicted in FIG. 10. The third sheet 82 of dielectric material may comprise low temperature cofired ceramic, high temperature cofired ceramic, ultra-low temperature cofired ceramic, laminate printed circuit board material, or other multilayer or additively manufactured microelectronic packaging substrate material. The portion of the third sheet 82 may be metallized using paste comprising conductive materials, deposition of conductive materials onto the third sheet 82, or the like.

Figure 11:
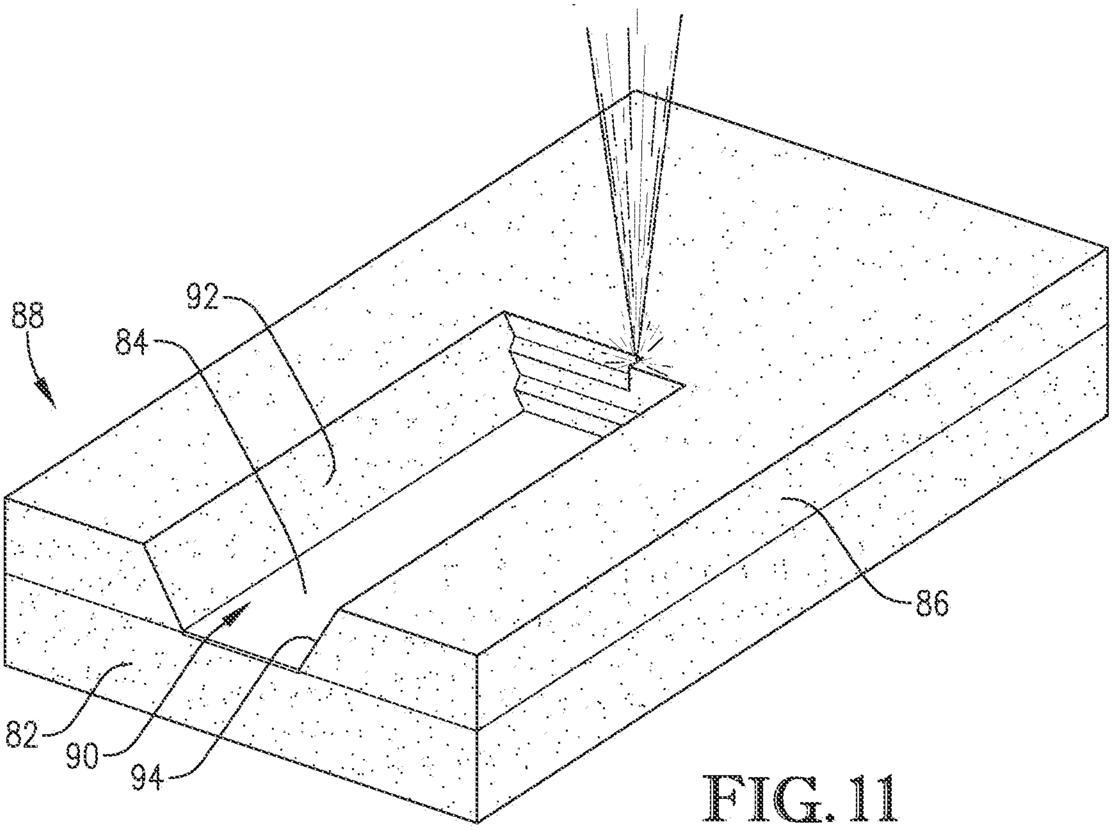
FIG. 11 is a perspective view of a fourth sheet of the waveguide of FIG. 7.

Referring to step 206, a fourth sheet 86 of dielectric material is laminated on the third sheet 82. The fourth sheet 86 may be laminated on the third sheet 82 so that the metal strip 84 is between the third sheet 82 and the fourth sheet 86 to form a second dielectric layer 88, as depicted in FIG. 11. The fourth sheet 86 may also comprise low temperature cofired ceramic, high temperature cofired ceramic, ultra-low temperature cofired ceramic, laminate printed circuit board material, or other multilayer or additively manufactured microelectronic packaging substrate material.

Referring to step 207, a portion of the fourth sheet 86 may be removed to expose at least a portion of the metallized strip 84. The portion of the fourth sheet 86 may be removed along a second axis to form a second channel 90, as depicted in FIG. 11. The channel 90 may comprise one or more side walls 92, 94 extending from the metallized strip 84. The portion of the fourth sheet 86 may be removed using machining, a laser, or the like.

Figure 12:
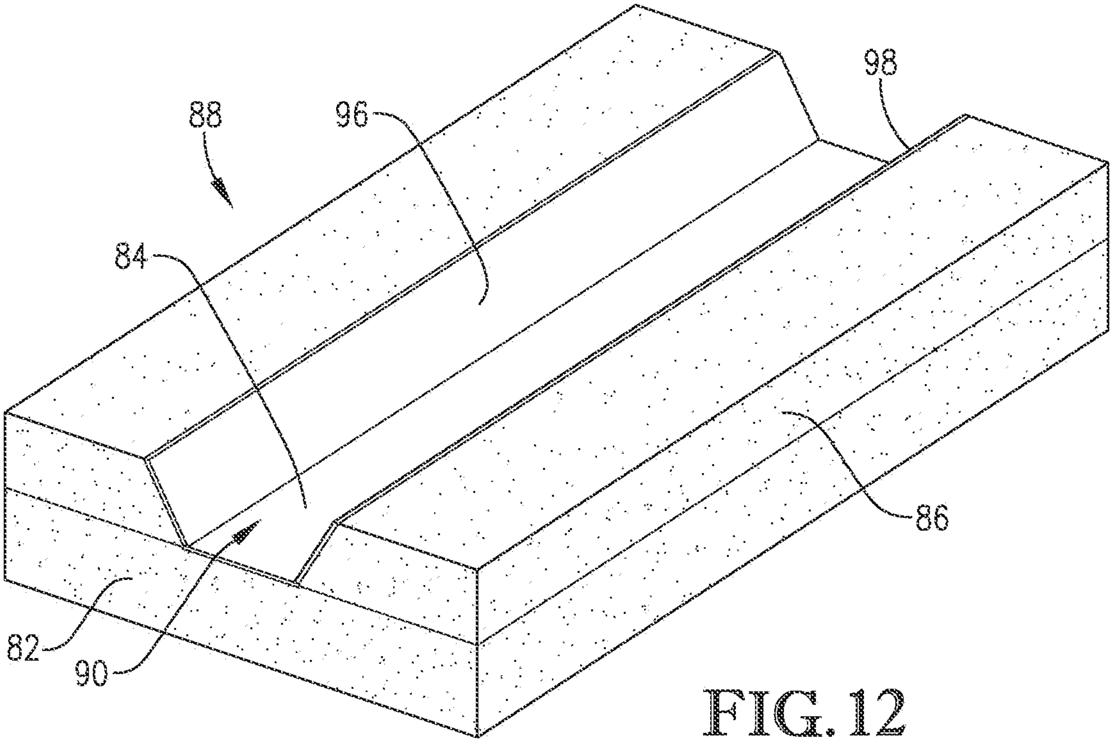
FIG. 12 is a perspective view of a second dielectric layer of the waveguide of FIG. 7.

Referring to step 208, the one or more walls 92, 94 of the second channel 90 (as depicted in FIG. 11) are metallized to form one or more metallized walls 96, 98 (as depicted in FIG. 12). The metallized walls 96, 98 may lie flatly on, or conform to the surfaces of, the walls 92, 94 of the second channel 90, as depicted in FIG. 12. The walls 92, 94 of the second channel 90 may be metallized using paste comprising conductive materials, deposition of conductive materials onto the walls 92, 94, or the like.

Figure 13:
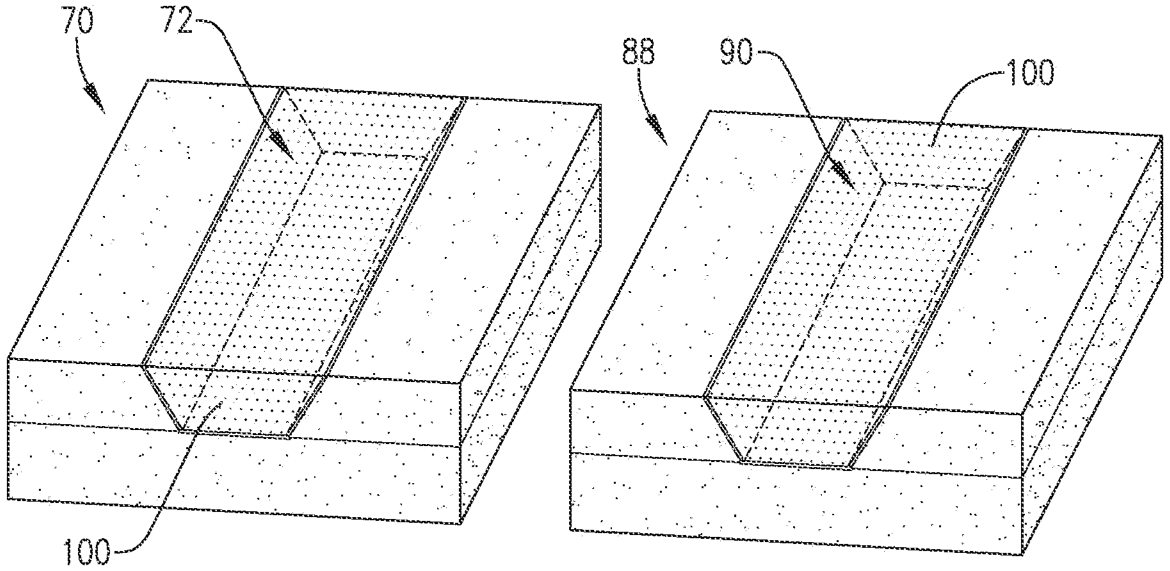
FIG. 13 is a perspective view the first and second dielectric layers of the waveguide of FIG. 7 having secondary material.

Referring to step 209, a secondary material 100 may be deposited in the first channel 72 and the second channel 90, as depicted in FIG. 13. The secondary material 100 (FIGS. 13 and 14) may comprise fugative material operable to burn off or vaporize when subject to sufficient heat, such as a carbon- based paste or tape material. In some embodiments, such as when the dielectric layers 70, 88 (FIGS. 13 and 14) comprise fiber glass or other non-ceramic materials, the secondary material 100 may comprise a fugative material that is removable via acid. In some embodiments, the secondary material 100 may comprise material having predetermined dielectric properties. For example, the secondary material 100 may comprise a dielectric having predetermined dielectric properties for tuning and/or matching an antenna to be attached to the waveguide.

Referring to step 210, the first dielectric layer 70 as depicted in FIG. 9 (comprising the first sheet 64 with metallized strip 66, the second sheet 68 with metallized walls 78, 80, and the secondary material 100 (depicted in FIGS. 13 and 14)) is positioned adjacent to the second dielectric layer 88 as depicted in FIG. 11 (comprising the third sheet 82 with metallized strip 84, the fourth sheet 86 with metallized walls 96, 98, and the secondary material 100 (depicted in FIGS. 13 and 14)). The layers 70, 88 may be positioned with their respective channels 72, 90 facing one another so that their respective axes are parallel to form a stack 102, as shown in FIG. 14.

Figure 14:
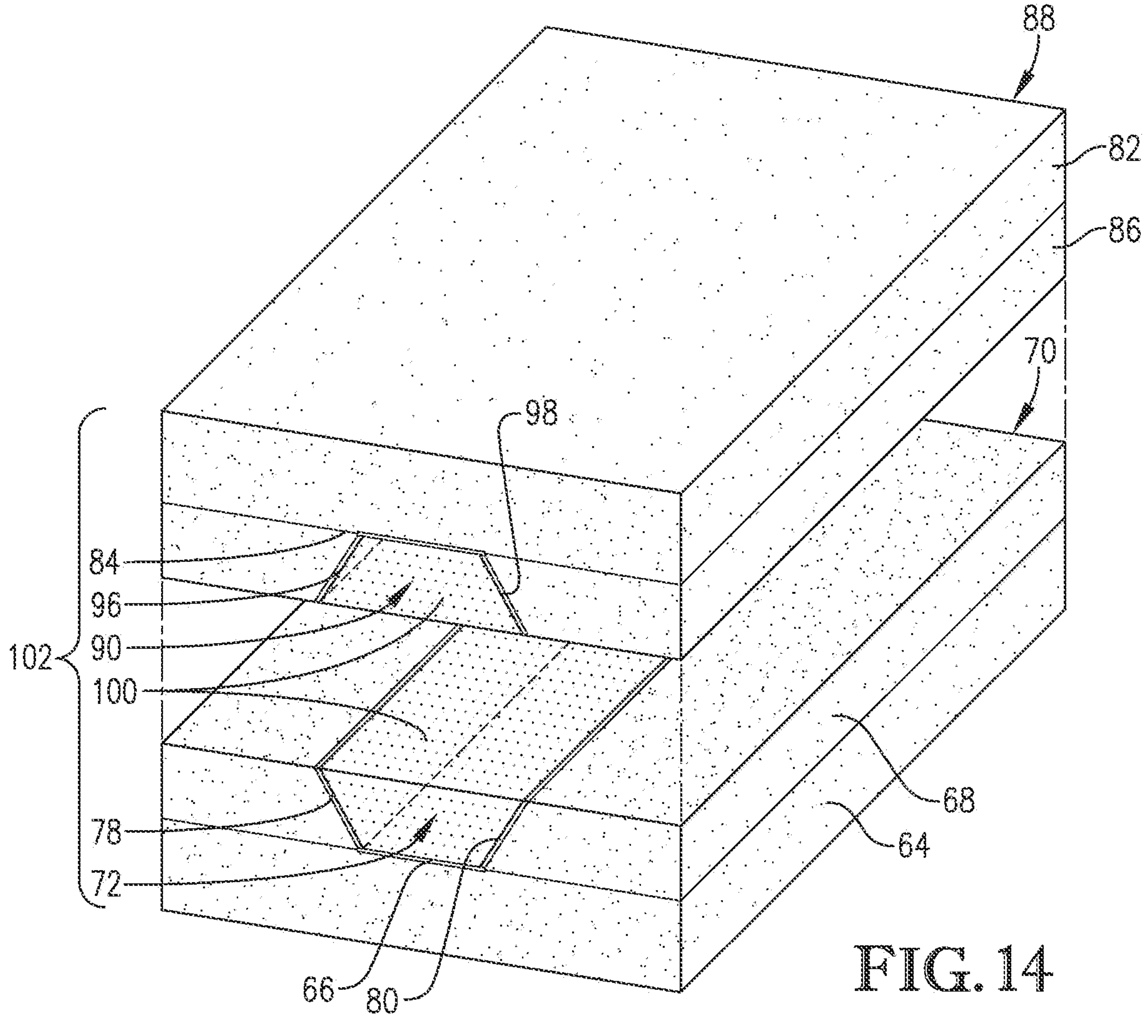
FIG. 14 is a perspective view of the first and second dielectric layers of the waveguide of FIG. 7 being stacked.
Figure 15A:
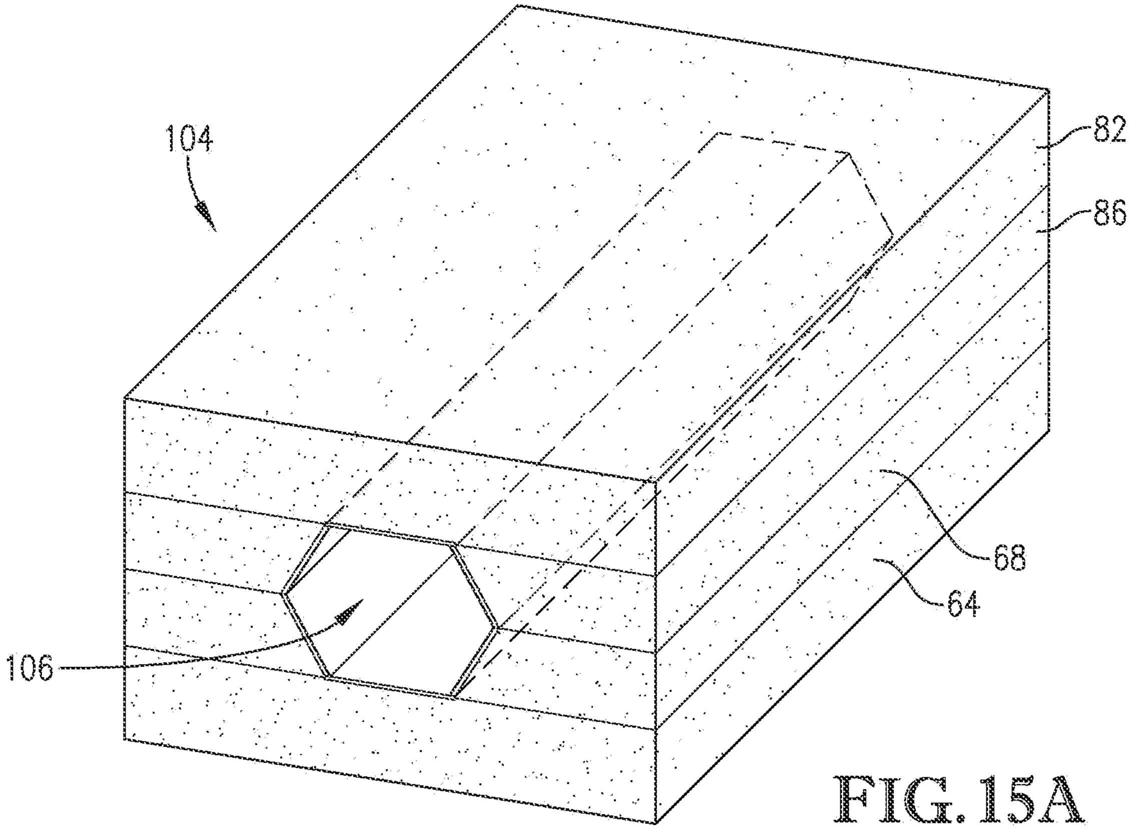
FIG. 15A is a perspective view of the waveguide of FIG. 7 without secondary material removed.
Figure 15B:
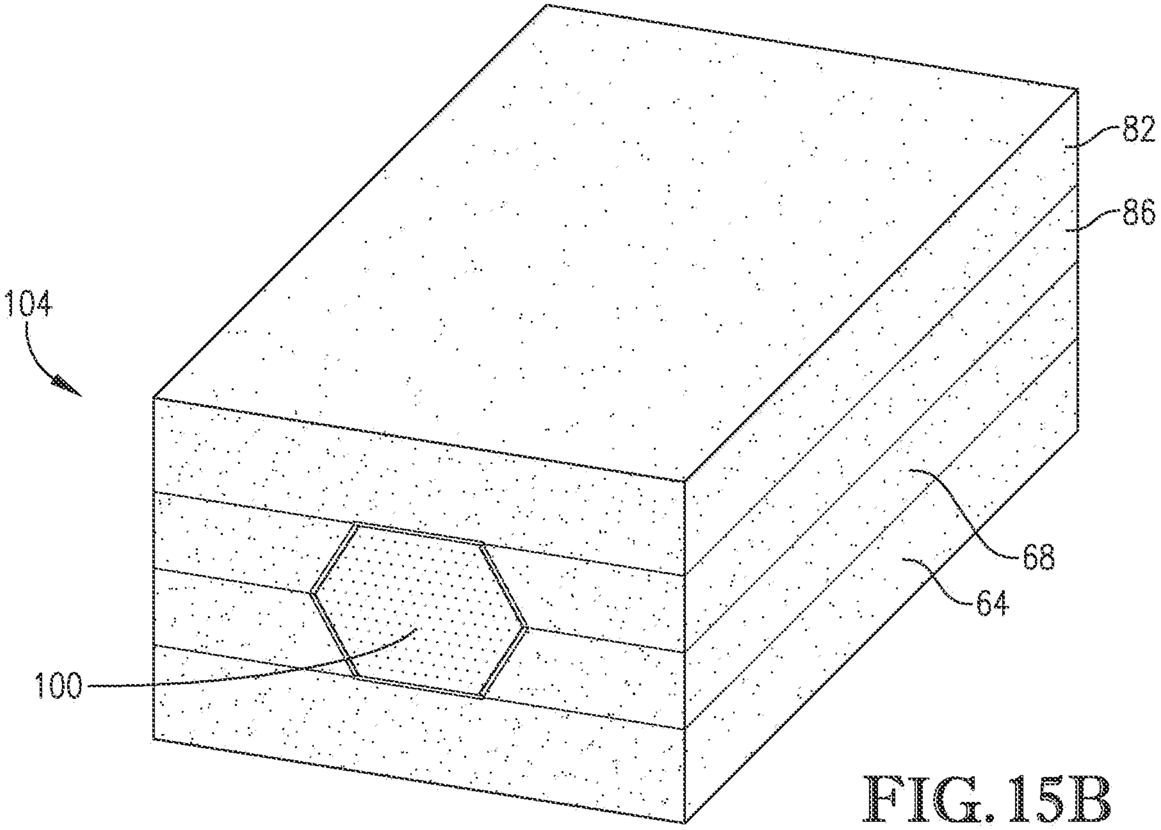
FIG. 15B is a perspective view of the waveguide of FIG. 7 having remaining secondary material.

Referring to step 211, the stack 102 (comprising sheets 64, 68, 86, 82) is heated, or sintered/cofired, so that the metallized strips 66, 84 and walls 78, 80, 96, 98 (as depicted in FIG. 14) bond to form a waveguide 104 (as depicted in FIGS. 15A and 15B). In some embodiments, the secondary material 100 burns off to leave an empty cavity 106, as depicted in FIG. 15A. In some embodiments, the secondary material 100 is a dielectric material and remains in the cavity 106, as depicted in FIG. 15B.

The method 200 may include additional, less, or alternate steps and/or device(s), including those discussed elsewhere herein. For example, the method 200 may include a step of adding end walls 50, 52 to the waveguide 10, as depicted in FIG. 3A. Alternatively or additionally, the method 200 may include a step of adding a flange 62A to an end of the waveguide 10A, as depicted in FIG. 5. One or more holes may also be bored in the dielectric layers and filled with conductive material to form vias. Sidewalls of the one or more holes may be coated to form sidewall coated vias.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An embedded waveguide comprising:
a substrate comprising-
a first outer surface,
a second outer surface opposing the first outer surface, and
a channel formed between the first outer surface and the second outer surface and comprising inner surfaces;

conductive walls located on the inner surfaces to define a cavity, each conductive wall comprising a first end and a second end;

a first via connected to the first end of one of the conductive walls;

a second via connected to the second end of one of the conductive walls; and an antenna electrically connected to the first via, and a circuit component connected to the second via, wherein the substrate comprises a plurality of stacked sheets.

2. The embedded waveguide of claim 1, further comprising a secondary material positioned within the cavity.

3. The embedded waveguide of claim 1, wherein the channel includes two opposing end walls.

4. The embedded waveguide of claim 3, further comprising end conductive walls located on the two opposing end walls of the channel.

5. The embedded waveguide of claim 1, wherein the channel has a hexagonal cross-sectional shape.

6. The embedded waveguide of claim 1, wherein the channel comprises a top inner surface parallel to the first outer surface.

7. The embedded waveguide of claim 6, wherein the conductive walls include a top conductive wall located on the top inner surface, and the first via and the second via are connected to the top conductive wall.

8. An embedded waveguide comprising:

a substrate comprisinga first outer surface, a second outer surface opposing the first outer surface, and a channel formed between the first outer surface and the second outer surface and comprising inner surfaces;

conductive walls located on the inner surfaces to define a cavity, each conductive wall comprising a first end and a second end;

a first via connected to the first end of one of the conductive walls;

a second via connected to the second end of one of the conductive walls;

an antenna electrically connected to the first via; and a circuit component electrically connected to the second via.

9. The embedded waveguide of claim 8, wherein the channel comprises a top inner surface parallel to the first outer surface.

10. The embedded waveguide of claim 9, wherein the conductive walls include a top conductive wall located on the top inner surface, and the first via and the second via are connected to the top conductive wall.

11. The embedded waveguide of claim 10, wherein the first via and the second via extend from the top conductive wall to the first outer surface.

12. The embedded waveguide of claim 8, wherein the antenna is operable to receive signals from the circuit component through the conductive walls.

13. The embedded waveguide of claim 8, wherein the channel has a hexagonal cross-sectional shape.

14. The embedded waveguide of claim 8, wherein the substrate comprises a plurality of stacked sheets of ceramic material.

15. The embedded waveguide of claim 8, further comprising dielectric material disposed within the cavity so that the conductive walls and dielectric material are tuned with the antenna.

16. A method of manufacturing a waveguide, the method comprising:

forming a first channel in a first layer of first dielectric material, the first channel comprising one or more first channel walls;

forming a second channel in a second layer of second dielectric material, the second channel comprising one or more second channel walls;

depositing electrically conductive material on the one or more first channel walls of the first channel;

depositing electrically conductive material on the one or more second channel walls of the second channel;

depositing fugative material in the first channel and the second channel;

arranging the first layer adjacent to the second layer to form a stack with the first channel axially aligned with and facing the second channel;

heating the stack so that the conductive material on the one or more first channel walls of the first channel and the conductive material on the one or more second channel walls of the second channel connect to form the waveguide and so that the fugative material is vaporized;

boring a hole extending from a top surface of the first layer to the first channel;

depositing electrically conductive material in the hole so that the electrically conductive material in the hole forms a via during the heating of the stack; and electrically connecting at least one of a circuit component or an antenna to the via.

17. The method of claim 16, further comprising:

metallizing a portion of a first sheet; and laminating a second sheet on the first sheet so that the metallized portion of the first sheet is between the first sheet and the second sheet to form the first layer.

* * * * *